United States Patent
Fraser

(10) Patent No.: US 10,136,426 B2
(45) Date of Patent: Nov. 20, 2018

(54) WIRELESS CONFERENCING SYSTEM USING NARROW-BAND CHANNELS

(71) Applicant: Dominant Technologies, LLC, Mapleton, UT (US)

(72) Inventor: Ronald H. Fraser, Mapleton, UT (US)

(73) Assignee: Dominant Technologies, LLC, Mapleton, UT (US)

(*) Notice: Subject to any disclaimer, the term of this patent is extended or adjusted under 35 U.S.C. 154(b) by 168 days.

(21) Appl. No.: 15/072,123

(22) Filed: Mar. 16, 2016

(65) Prior Publication Data

US 2016/0198463 A1 Jul. 7, 2016

Related U.S. Application Data

(63) Continuation-in-part of application No. 14/961,621, filed on Dec. 7, 2015, now Pat. No. 9,538,570.

(60) Provisional application No. 62/134,330, filed on Mar. 17, 2015, provisional application No. 62/088,338,
(Continued)

(51) Int. Cl.
*H04J 3/00* (2006.01)
*H04W 72/04* (2009.01)
*H04W 4/08* (2009.01)
*H04B 7/26* (2006.01)
*H04L 29/06* (2006.01)
*H04W 4/10* (2009.01)
*H04L 12/18* (2006.01)
*H04W 76/45* (2018.01)
(Continued)

(52) U.S. Cl.
CPC ...... *H04W 72/0446* (2013.01); *H04B 7/2656* (2013.01); *H04J 3/00* (2013.01); *H04L 12/189* (2013.01); *H04L 12/1813* (2013.01); *H04L 65/4061* (2013.01); *H04W 4/08* (2013.01); *H04W 4/10* (2013.01); *H04W 76/45* (2018.02); *H04L 5/14* (2013.01); *H04W 84/08* (2013.01)

(58) Field of Classification Search
CPC ........... H04W 72/0446; H04W 76/005; H04W 4/10; H04W 4/08; H04W 84/08; H04L 12/189; H04L 12/1813; H04L 65/4061; H04L 41/0803; H04L 5/14; H04B 7/2656
USPC .................................................. 370/280, 281
See application file for complete search history.

(56) References Cited

U.S. PATENT DOCUMENTS 6,178,323 B1 1/2001 Nagata
6,453,168 B1 9/2002 McCrady et al.
(Continued)

FOREIGN PATENT DOCUMENTS

WO 2009/134107 A2 11/2009
WO 2016/090370 6/2016

OTHER PUBLICATIONS

U.S. Appl. No. 10/194,115, Non-Final Office Action dated Dec. 13, 2005, 8 pages.
(Continued)

*Primary Examiner* — Chuong T Ho
(74) *Attorney, Agent, or Firm* — Kilpatrick Townsend & Stockton LLP

(57) ABSTRACT

A wireless-conferencing system enables two or more radios to communicate with each other in full-duplex communication, such as by using time division multiple access (TDMA). To use the wireless-conferencing system in a narrowband radio service system, such as GMRS having channel spacing of 25 kHz, one or more techniques are used to implement the wireless-conferencing system.

18 Claims, 4 Drawing Sheets

Related U.S. Application Data filed on Dec. 5, 2014, provisional application No. 62/087,964, filed on Dec. 5, 2014.

(51) Int. Cl.
*H04L 5/14* (2006.01)
*H04W 84/08* (2009.01)

(56) References Cited

U.S. PATENT DOCUMENTS

| | | | |
|---|---|---|---|
| 6,463,290 B1* | 10/2002 | Stilp | G01S 5/02 |
| | | | 455/456.1 |
| 6,542,494 B1 | 4/2003 | Sugaya et al. | |
| 6,590,928 B1 | 7/2003 | Haartsen | |
| 6,771,689 B2* | 8/2004 | Solondz | H04B 7/0671 |
| | | | 375/144 |
| 7,054,436 B2 | 5/2006 | Stenmark | |
| 7,554,948 B2 | 6/2009 | Naguib et al. | |
| 7,710,876 B2 | 5/2010 | Becker | |
| 7,961,702 B2 | 6/2011 | Salonidis | |
| 8,150,450 B1 | 3/2012 | Wengrovitz | |
| 8,433,349 B2 | 4/2013 | Jovicic et al. | |
| 8,526,645 B2 | 9/2013 | Boilot et al. | |
| 8,681,663 B2 | 3/2014 | Fraser | |
| 8,705,377 B2 | 4/2014 | Fraser | |
| 9,143,309 B2 | 9/2015 | Fraser | |
| 9,232,500 B2 | 1/2016 | Tiirola et al. | |
| 2001/0012757 A1 | 8/2001 | Boyle | |
| 2001/0019592 A1* | 9/2001 | Solondz | H04B 7/0671 |
| | | | 375/267 |
| 2002/0067709 A1 | 6/2002 | Yamada et al. | |
| 2002/0141602 A1 | 10/2002 | Nemirovski | |
| 2003/0035406 A1 | 2/2003 | Fraser et al. | |
| 2004/0037438 A1 | 2/2004 | Liu et al. | |
| 2004/0066940 A1 | 4/2004 | Amir | |
| 2004/0137906 A1 | 7/2004 | Nakao et al. | |
| 2005/0013456 A1 | 1/2005 | Chalupper et al. | |
| 2005/0111383 A1 | 5/2005 | Grob et al. | |
| 2005/0199723 A1 | 9/2005 | Lubow | |
| 2005/0206217 A1 | 9/2005 | Koschel et al. | |
| 2005/0281321 A1 | 12/2005 | Bergstrom et al. | |
| 2006/0229083 A1 | 10/2006 | Redi | |
| 2006/0281463 A1 | 12/2006 | Yang | |
| 2008/0025341 A1* | 1/2008 | Rao | H04W 72/048 |
| | | | 370/468 |
| 2008/0057857 A1 | 3/2008 | Smith | |
| 2009/0011719 A1 | 1/2009 | Khabashesku et al. | |
| 2009/0149722 A1 | 6/2009 | Abolfathi et al. | |
| 2010/0002676 A1 | 1/2010 | Doi et al. | |
| 2011/0106952 A1 | 5/2011 | Doppler et al. | |
| 2012/0044827 A1 | 2/2012 | In et al. | |
| 2012/0058754 A1 | 3/2012 | Gouse et al. | |
| 2012/0087354 A1* | 4/2012 | LoGalbo | H04B 7/022 |
| | | | 370/337 |
| 2013/0272196 A1 | 10/2013 | Li et al. | |
| 2013/0329610 A1* | 12/2013 | Fraser | H04W 72/0446 |
| | | | 370/263 |
| 2014/0051472 A1 | 2/2014 | Guo | |
| 2014/0112175 A1 | 4/2014 | Pantelidou et al. | |
| 2014/0187283 A1 | 7/2014 | Nimbalker et al. | |
| 2014/0206322 A1 | 7/2014 | Dimou et al. | |
| 2015/0023227 A1* | 1/2015 | Khoo | H04L 5/14 |
| | | | 370/280 |
| 2015/0098444 A1 | 4/2015 | Marzetta et al. | |
| 2015/0319797 A1 | 11/2015 | Yamada et al. | |
| 2016/0044704 A1 | 2/2016 | Li et al. | |
| 2016/0164658 A1 | 6/2016 | Fraser | |

OTHER PUBLICATIONS

U.S. Appl. No. 13/863,282, Non-Final Office Action dated Jun. 3, 2015 all pages.
U.S. Appl. No. 13/863,282, Non-Final Office Action dated Dec. 9, 2015, all pages.
U.S. Appl. No. 13/961,647, Non-Final Office Action dated Oct. 16, 2013, 12 pages.
U.S. Appl. No. 13/961,736, Preinterview First Office Action dated Oct. 17, 2013, 5 pages.
U.S. Appl. No. 14/961,621 Preinterview First Office Action dated Mar. 3, 2016, all pages.
U.S. Appl. No. 14/961,661 Preinterview First Office Action dated Jul. 13, 2016, all pages.
Invitation to Pay Additional Fees and Partial Search Report dated Jan. 22, 2016 for PCT Application No. PCT/US2015/064304, all pages.
International Search Report and Written Opinion dated Mar. 29, 2016 for PCT Patent Application No. PCT/US2015/064304, 17 pages.
Science Blog, "New earbud design could eliminate listener fatigue" Science Blog.com, Published on May 13, 2011. Retrieved on Dec. 29, 2015, 3 pages. <http://scienceblog.com/45330/new-earbud-design-could-eliminate-listener-fatigue/#RoLmxMGApsolOdB.97>.

* cited by examiner

WIRELESS CONFERENCING SYSTEM USING NARROW-BAND CHANNELS

CROSS-REFERENCE TO RELATED APPLICATION

This application claims priority to U.S. Provisional Patent Application No. 62/134,330, filed on Mar. 17, 2015, entitled "Wireless Conferencing System Using Narrow-Band Channels," the disclosure of which is incorporated by reference in its entirety for all purposes. This application is also a continuation-in-part of U.S. patent application Ser. No. 14/961,621, filed on Dec. 7, 2015, which claims priority to U.S. Provisional Patent Application No. 62/088,338, filed on Dec. 5, 2014, and to U.S. Provisional Patent Application No. 62/087,964, filed on Dec. 5, 2014; the disclosures of which are incorporated by reference in their entirety for all purposes.

BACKGROUND

This disclosure relates in general to radio communication, and more specifically, without limitation, to two-way commination using portable radios. Two-way radios enable wireless communication between two or more people. Many two-way radios require either a push-to-talk (PTT) button or a voice operated switch (VOX). For example, walkie-talkies require either a PTT button or VOX. One disadvantage of both PTT and VOX is that both PTT and VOX communications are half-duplex. In half-duplex communication, a radio can either transmit or receive at a given time, not both. In this application, the term PTT radio generally refers to radios using half-duplex communication where a user can either speak or listen at a given time, not both.

Full-duplex communication, commonly referred to as duplex communication, permits a user of a radio to both speak and listen at the same time. One way a radio can operate in a duplex mode, without needing a PTT button or VOX, is by using a base station. An example of wireless radios connected by a base station, and thus enabling full-duplex communication, is two users talking to each other using cell phones, where communication is transmitted by one or more cell towers. Another example of wireless radios connected by a base station is a home telephone system with wireless telephones that can be placed in a conferencing mode.

BRIEF SUMMARY

Time division multiple access (TDMA) is used to provide full-duplex communication to users of a narrowband radio service. Narrowband radio services generally use half-duplex, PTT radios. Examples of a narrowband radio service include the General Mobile Radio Service (GMRS) and Family Radio Service (FRS). Channel spacing limits transmission bandwidth and thus how much data can be transmitted in a given time. This disclosure discusses systems and methods for implementing TDMA on narrowband radio services.

In some embodiments, a system of duplex radios for communicating on a narrowband radio service comprises a first radio and a second radio. In some embodiments, the system comprises a third radio. The first radio comprises a transmitter, a receiver, and electronics. The second radio comprises a transmitter, a receiver, and electronics. The electronics of the first radio are configured to cause the transmitter of the first radio to transmit a first communication using a time division multiple access protocol, wherein transmitting the first communication uses a bandwidth equal to or less than 30 kHz and equal to or greater than 1 kHz, and the first transmission comprises voice data, and the first radio is assigned a first time slot of the time division multiple access protocol to transmit voice data; receive a second communication from the receiver of the first radio; and generate a first audio stream based on the second communication. The electronics of the second radio are configured to receive the first communication from the receiver of the second radio, wherein the receiver of the second radio directly receives the first communication transmitted from the transmitter of the first radio; cause the transmitter of the second radio to transmit the second communication using the time division multiple access protocol, wherein transmitting the second communication uses a bandwidth equal to or less than 30 kHz and equal to or greater than 1 kHz, the second communication comprises voice data; and the second radio is assigned a second time slot of the time division multiple access protocol to transmit voice data; and generate a second audio stream based on the first communication and the time division multiple access protocol.

In some embodiments, a method of duplex radio communication using a narrowband radio service comprises: generating a first communication, wherein the first communication comprises voice data from a user of a first radio; transmitting the first communication using the first radio, wherein: transmitting the first communication uses a bandwidth equal to or less than 30 kHz and equal to or greater than 1 kHz, the first transmission comprises the voice data from the user of the first radio, and transmitting the first communication uses a time division multiple access protocol; switching the first radio from transmitting to receiving within a frame of a time division multiple access protocol; receiving a second communication and a third communication, wherein the second communication comprises voice data from a user of a second radio, the second communication is received after the first communication is transmitted; and the third communication is received after the second communication; and generating an audio stream using the second communication, the third communication, and the time division multiple access protocol.

Further areas of applicability of the present disclosure will become apparent from the detailed description provided. It should be understood that the detailed description and specific examples, while indicating various embodiments, are intended for purposes of illustration only and are not intended to necessarily limit the scope of the disclosure.

Figure 1:
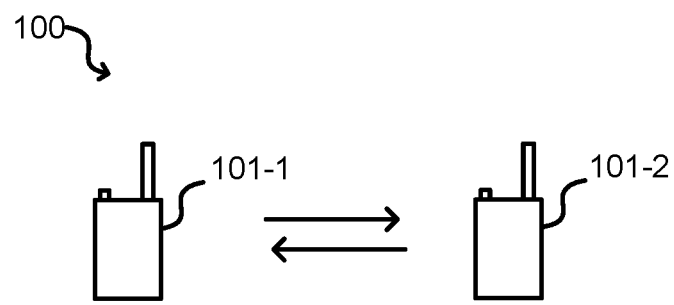
FIG. 1 is a simplified diagram of an embodiment of two radios communicating using a time division multiple access (TDMA) protocol.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Some PTT radios are configured to communicate on GMRS and/or FRS channels. A user of a PTT radio selects a first channel (e.g., using the PTT radio). While the user pushes a button on the PTT radio, the PTT radio transmits on the first channel. While the user does not push the button on the PTT radio, the PTT radio no longer transmits, but receives on the first channel. Time to switch between transmit and receive on the PTT radio is not relevant (e.g., 90 milliseconds or longer).

Embodiments relate generally to full-duplex, two-way radio communication. Narrowband radio services generally use half-duplex, PTT radios. Examples of a narrowband radio service include the General Mobile Radio Service (GMRS) and Family Radio Service (FRS). GMRS has 23 channels with 25 kHz bandwidth; FRS has 14 channels with 12.5 kHz bandwidth; see Table I below for channel frequencies of GMRS and FRS. Channel spacing and/or channel bandwidth limit how much data can be transmitted during a given time.

TABLE I

| GMRS and FRS Channels | |
|---|---|
| GMRS Channels (MHz) | FRS Channels (MHz) |
| 462.5500 | 462.5625 |
| 462.5625 | 462.5875 |
| 462.5750 | 462.6125 |
| 462.5875 | 462.6375 |
| 462.6000 | 462.6625 |
| 462.6125 | 462.6875 |
| 462.6250 | 462.7125 |
| 462.6375 | 467.5625 |
| 462.6500 | 467.5875 |
| 462.6625 | 467.6125 |
| 462.6750 | 467.6375 |
| 462.6875 | 467.6625 |
| 462.7000 | 467.6875 |
| 462.7125 | 467.7125 |
| 462.7250 | |
| 467.5500 | |
| 467.5750 | |
| 467.6000 | |
| 467.6250 | |
| 467.6500 | |

TABLE I-continued

| GMRS and FRS Channels | |
|---|---|
| GMRS Channels (MHz) | FRS Channels (MHz) |
| 467.6750 | |
| 467.7000 | |
| 467.7250 | |

One challenge of operating the wireless-conferencing system 100 on GMRS and/or FRS channels is narrow channel spacing, which equates to narrow bandwidth. For example, channel spacing for GMRS is 25 kHz. To ensure transmission is within a channel (e.g., because of crystal drift), actual channel bandwidth is sometimes equal to or less than 16 kHz or 10 kHz. Some channel spacing is 12.5 kHz with bandwidth equal to or less than 8 kHz or 5 kHz. Some authors have expressly taught away from combining TDMA with narrowband radio services because of the narrow bandwidth (e.g., U.S. Publication No. 2009/0011719, ¶8).

This disclosure discusses systems and methods for implementing TDMA on narrowband radio services. Systems and methods in this disclosure can also be used to provide full-duplex communication to augment and/or replace other traditional PTT radios. Examples of other traditional PTT radios include business-band radios, such as those that operate in the 150-174 MHz and/or 421-470 MHz bands, and P25 (Project 25) digital radios used by federal, state/province, and/or local public safety agencies.

Referring first to FIG. 1, a simplified diagram of an embodiment of a wireless-conferencing system 100 having two radios communicating using a time division multiple access (TDMA) protocol is shown. In FIG. 1, a first radio 101-1 and a second radio 101-2 communicate directly with each other. In some embodiments, direct communication means that there is no base station (e.g., an antenna of the first radio 101-1 receives electromagnetic radiation emitted from an antenna of the second radio 101-2; the first radio 101-1 converts the received electromagnetic radiation into an analog voice stream, digital voice data, and/or digital non-voice data). Examples of wireless-conferencing systems that use full-duplex, TDMA communication without a base station include systems described in U.S. patent application Ser. No. 10/194,115, filed on Jul. 11, 2002; U.S. patent application Ser. No. 13/961,647, filed on Aug. 7, 2013; and U.S. patent application Ser. No. 14/961,621, filed on Dec. 7, 2015, which are incorporated by reference.

Figure 2:
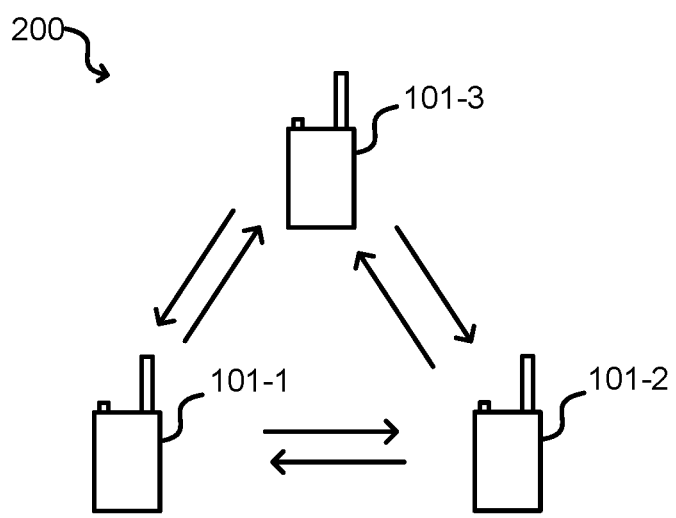
FIG. 2 is a simplified diagram of an embodiment of three radios communicating using a TDMA protocol.

In FIG. 2, a simplified diagram of an embodiment of a wireless-conferencing system 200 with three radios communicating using a TDMA protocol is shown. The first radio 101-1, the second radio 101-2, and a third radio 101-3 directly communicate with each other (e.g., without using a base station). The first radio 101-1, the second radio 101-2, and the third radio 101-3 provide full-duplex communication for users. The first radio 101-1 receives direct communication from the second radio 101-2 and the third radio 101-3. The second radio 101-2 receives direct communication from the first radio 101-1 and the third radio 101-3. The third radio 101-3 receives direct communication from the first radio 101-1 and the second radio 101-2. Using TDMA, a user of the first radio 101-1 can simultaneously speak and listen to users of the second radio 101-2 and/or the third radio 101-3. Further, if a user of the second radio 101-2 and a user of the third radio 101-3 speak at the same time, the user of the first radio 101-1 can hear both the user of the second radio 101-2 and the user of the third radio 101-3.

Figures 3A, 3B:
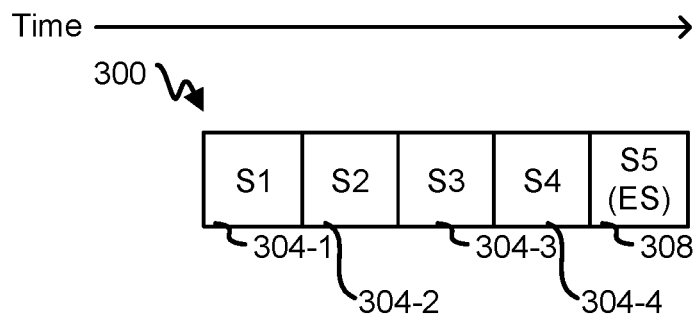
FIG. 3A is an embodiment of a frame, used in TDMA, divided into time slots.
FIG. 3B shows an embodiment of time progression for multiple frames for TDMA.

FIG. 3A shows an embodiment of a frame 300 used for TDMA, wherein the frame 300 is divided into time slots. The frame 300 is a specified duration of time (e.g., 14 ms). The frame 300 comprises four voice slots 304 and an extra slot 308. The voice slots 304 are used to transmit voice data; and, in some embodiments, to also transmit non-voice data. The extra slot 308 is used to transmit non-voice data. A first voice slot 304-1 (S1) is followed by a second voice slot 304-2 (S2), followed by a third voice slot 304-3 (S3), followed by a fourth voice slot 304-4 (S4), followed by the extra slot 308 (S5 or ES).

In some embodiments, each of the voice slots 304 are of equal length (e.g., 3 ms). The first voice slot 304-1 is allocated to the master radio of a wireless-conferencing group. An audio sampling rate and RF (radio frequency) data rate are set up so that audio data that is collected during one frame 300 can be transmitted in one of the time slots. In some embodiments, voice data is not compressed. In some embodiments, voice data is compressed. For example, voice signals from a microphone of a radio 101 are sampled at rate 'x' for a frame 300, creating voice data. The voice data is then transmitted to other radios at rate 'y,' wherein rate y is equal to or greater than rate x. In some embodiments, rate y is more than double rate x. The extra slot 308 is set up to transmit non-voice data (e.g., heart rate, GPS, gyroscope data, commands, responses, etc.). In some embodiments, the extra slot 308 is subdivided into multiple smaller time slots for sending non-voice data by several radios. Each of the smaller time slots (also referred to as mini time slots) in the extra slot 308 has enough time to send a preamble before each non-voice data stream, unless one radio uses more than one consecutive mini time slot to send more non-voice data.

In some embodiments, five time slots are used, with four time slots for voice slots 304 and on time slot for the extra slot 308. Though if more time for non-voice data is desired, there could be three voice slots 304 and two extra slots 308. In some embodiments, the frame 300 is 14 milliseconds (ms) long (+/−10, 5, or 3 ms). In some embodiments, voice slots 304 are 3 ms (+/−0.5 ms) and the extra slot 308 is 2 ms (+0.5 ms/−1.5 ms). A person of skill in the art will recognize variations depending on an application. In some embodiments, only three or two time slots are used. For example, three voice slots 304 are used without an extra slot 308, or two voice slots 304 are used with one extra slot 308. In some embodiments, less time slots are used to reduce an amount of bandwidth. In some embodiments, there are four time slots (e.g., three time slots used as voice slots 304 and one time slot used as the extra slot 308).

FIG. 3B shows an embodiment of time progression for multiple frames 300. Time progresses from a first time slot (S1) of a first frame 300-1 to a last time slot of the first frame 300-1 (in this example to time slot 5 (S5)). Time then progresses from the last time slot of the first frame 300-1 (e.g., S5) to the first time slot (S1) of a second frame 300-2; then from the first time slot (S1) of the second frame 300-2 to the last time slot of the second frame 300-2; then from second frame 300-2 to the a third frame 300-3; and from the third frame 300-3 to a fourth frame 300-4, and so on.

Figure 4:
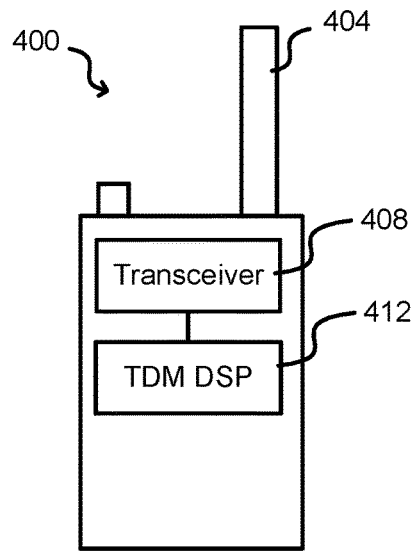
FIG. 4 depicts a block diagram of an embodiment of a radio used for TDMA communication.

FIG. 4 depicts an embodiment of a radio 400 for communicating on a narrowband radio service (e.g., GMRS or FRS). The radio 400 comprises an antenna 404, a transceiver 408 (which includes a transmitter and a receiver), and a time division multiplexing (TDM) digital-signal processor (DSP) 412. Though TDM is used, in some embodiments other multiple access protocols are used. The transceiver 408 is connected to the antenna 404 and to the TDM DSP 412. The TDM DSP 412 is used to operate the radio 400 in a wireless-conferencing system (e.g., the wireless-conferencing system 100, 200). For example the radio 400 is used as radio 101. In some embodiments, the TDM DSP 412 is digital. In some embodiments, the TDM DSP 412 combines analog and digital components. In some embodiments, the TDM DSP 412 encrypts and/or decrypts data and/or signals.

Figure 5:
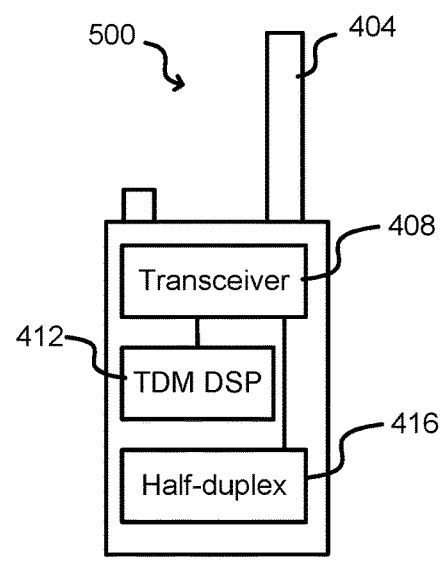
FIG. 5 depicts a block diagram of another embodiment of a radio used for TDMA communication.

FIG. 5 depicts an embodiment of a radio 500 for communicating on a narrowband radio service. The radio 500 has an antenna 404, a transceiver 408, and a TDM DSP 412, similar to the radio 400. The TDM DSP is used to operate the radio 500 in the wireless-conferencing system 100. The radio 500 further comprises half-duplex circuitry 416. In some embodiments, the half-duplex circuitry 416 comprises a digital signal processor and/or analog circuitry. In some embodiments, the half-duplex circuitry 416 enables the radio 500 to function as a PTT radio. In some embodiments, a user of the radio 500 switches between the TDM DSP 412 and the half-duplex circuitry 416 (e.g., to communicate with users outside of the wireless-conferencing system, such as a user monitoring an emergency channel with a radio configured to receive analog signals). In some embodiments, the half-duplex circuitry 416 operates the radio 500 on a first frequency channel, and the TDM DSP 412 operates the radio 500 on a second frequency channel. In some embodiments, the first channel is the same as the second channel.

In some embodiments, to operate a wireless-conferencing system on a radio service system having narrow bandwidths (e.g., bandwidth and/or channel spacing equal to or less than 30 kHz, 25 kHz, 20 kHz, 16 kHz, 12.5 kHz, 8 kHz, and/or 5 kHz), such a GMRS and/or FRS, one or more of the following techniques are used (e.g., implemented by the TDM DSP 412):

A. High Data Compression

In some embodiments, data compression is used to compress audio signals (e.g., speech encoding, modified discrete cosine transform, linear predictive coding, quantization, etc.). In some embodiments, very high audio compression techniques are used. Some examples of very high audio compression techniques include True Speech from DSP Group, ACELP (Algebraic Code Excited Linear Prediction), CELP (Code Excited Linear Prediction), VSELP (Vector Sum Excited Linear Prediction), etc., used individually or in a combination of two or more techniques. In some embodiments, a combined audio rate of several audio inputs from several radios will be such that a data rate will fit into an allocated channel bandwidth.

B. Reduce Switching Time Between Transmit and Receive

In some embodiments, in a TDM system, a segment of time is divided into slots. Radios take turns transmitting during one or more slots and receiving during one or more slots. In some embodiments, a fast switch is used to switch between transmit and receive. An example of a fast switch is a fractional-n-synthesizer. In some embodiments, a fast switch can switch between transmit and receive in less than 15,000 μs, 10,000 μs, 1,000 μs, or even less than 120, 100, and/or 80 μs; and faster than 1 μs. Traditional PTT radios typically don't need a fast switch.

C. Complex Modulation

In some embodiments, complex modulation is used to more fully utilize available bandwidth and/or a number of time slots used. For example, in some embodiments orthogonal frequency division multiplexing (OFDM) is used, using multiple carrier frequencies in a given bandwidth range (e.g., with data rates of 1 kbits/s). In some embodiments, more tightly placing carrier frequencies within the given bandwidth range increases bandwidth utilization by allowing use of more carrier frequencies. In some embodiments, frequency-shift keying (FSK) and/or phase-shift keying (PSK) are used. For example, in some embodiments 4-level PSK is used.

D. Reduction of Preambles

In some embodiments, preambles, comprising data packets, are reduced (e.g., as compared to preambles discussed in the '621 application. Some wireless-conferencing systems use multiple data packets in preambles (e.g., data packets for radio ID, one or more group number IDs, master-radio ID, IDs for other radios in the wireless-conferencing system, system ID, command(s), etc.). In some embodiments, having multiple groups enables radios to participate in different "rooms" as discussed in U.S. Patent Application No. 62/088, 338, filed on Dec. 5, 2014; which is incorporated by reference. In some embodiments, a transmission comprises a preamble and voice data. In some embodiments, the preamble comprises a command and/or a request. Examples of a command and/or request include: a slave to take a voice slot 304; a slave to give up a voice slot 304 (e.g., to become a listen-only radio); to turn off a mic; to turn off a speaker but leave a mic on; to turn off lights of a radio 101; to request a voice slot 304; to notify that a radio is giving up a voice slot (e.g., to go to listen only mode). In some embodiments, commands and/or requests are predefined so that the command or request can be transmitted with a limited number of bits (e.g., 5, 4, or 3 bits). Table II below gives an example of commands/requests using three bits. In some embodiments, two additional bits (or more) are used to identify a radio that the command/request is directed to. In some embodiments, two additional bits (or more) are used to identify a radio making the command/request). U.S. application Ser. No. 14/225,183, filed on Mar. 25, 2014, now U.S. Pat. No. 9,143,309, which is incorporated by reference, describes additional commands and/or requests.

TABLE II

Sample Commands/Requests

| Bits | Meaning |
| --- | --- |
| 000 | Enter listen-only mode (master direction to slave) |
| 001 | Transmit on slot 1 |
| 010 | Transmit on slot 2 |
| 011 | Transmit on slot 3 |
| 100 | Request a voice slot (slave request voice slot from master) |
| 101 | Entering listen-only mode (slave releasing voice slot) |
| 110 | Master becoming a slave (enter search-for-master mode) |
| 111 | Slave request to be master |

In some embodiments, data packets in preambles are reduced to save data. For example, in some embodiments, preambles are reduced to the group ID, system ID, and one command/request. In some embodiments, preambles are reduced to the group ID in one frame and the system ID in a later frame, etc. In some embodiments, commands are sent only periodically (e.g., every fifth frame and/or only during the extra slot, wherein transmission during the extra slot is rotated between radios during different frames). In some embodiments, a short time slot (e.g., the extra slot 308) is used for exchanging just commands in order to leave more room for voice data. For example, slots 1, 2, 3, and 4 are used for voice data and are three milliseconds each. Slot 5 is used for commands and is less than one millisecond (e.g., less than 500 microseconds). Further, radios can take turns transmitting commands and/or data other than voice data on slot 5 as described in the '338 application. In some embodiments, one or more data packets (e.g., for group number ID) are used for clock recovery (e.g., as described below with a parallel correlator), which reduces an amount of data used for clock recovery.

E. Parallel Correlator

In some embodiments, a parallel correlator is used for clock recovery. In a TDMA system, radios keep in time with a clock to transmit and receive during proper time slots. Clock data is sent (e.g., by a master radio as clock bits as part of a preamble). In some embodiments, a parallel correlator is used. In some embodiments, the parallel correlator uses a SAWs filter to recognize a particular frequency pattern. The longer the particular frequency pattern, the more the parallel correlator rejects noise. In some embodiments, 20, 30, 40, or 50 clock bits of preamble are used for clock recovery. In some embodiments, a data packet is used as the pattern for the parallel correlator. For example, a set of bits representing the group ID (and/or the system ID) is used for the pattern of the parallel correlator. In some embodiments, a shifting data pattern is used. In some embodiments, a phase lock loop (PLL) is used in conjunction with, or in lieu of, the parallel correlator. By using bits in a data packet for the parallel correlator, the preamble is shortened.

For example, a group ID is used as a pattern for a parallel correlator, and a clock rate of 25 kHz is used. The group ID is a known sequence of bits. The TDM DSP 412 of the first radio 101-1, samples a signal received from the second radio 101-2 using a sample rate. The sample rate is higher than the clock rate. For example, the sample rate is 5, 8, 10, 16, 20, 30, 32, 50, 64, 80, or 128 times the clock rate. If the group ID is 20 bits, and the sample rate is 10 times the clock rate, then the TDM DSP 412 will record 200 flip flops while identifying the group ID. Once the group ID is identified, such as by correlating 20 received bits, 200 flip flops, to the known sequence, a clock edge can be determined. In some embodiments, the TDM DSP 412 continues to oversample the received signal to filter noise. For example, a sampling rate of 10 times the clock rate produces ten flip flops (ones or zeros) per bit. Whether the bit is considered a 1 or a 0 is based on if there are more "1" flip flops or more "0" flip flops sampled. For example, ten flip flops recorded are: 1011111110. Since there are eight "1" and two "0", the bit is determined as a "1".

F. Multiple Parallel Correlators

In some embodiments, multiple parallel correlators are used for clock recovery. For example, group number and system ID are both used as data strings for clock recovery (e.g., to decrease overhead time). In some embodiments, no separate clock recovery code is used. In some embodiments, a first part of a preamble is the same for each transmission, which would allow a single parallel correlator. In some embodiments, multiple parts of the preamble are used to create a longer parallel correlator. For example, instead of using just 20 bits of the system ID, the radio uses the system ID and 20 bits of a group ID, thus having a parallel correlator that is 40 bits instead of 20 bits. Using a longer parallel correlator improves clock recovery and rejects noise.

In some embodiments, a given set of correlators are used. For example, in an embodiment of a wireless-conferencing system, there are six different groups. Each group has a unique group ID (bit sequence). In some embodiments, each group has a unique hopping sequence. As a radio 101 receives a data transmission, the radio analyzes the preamble for a bit sequence identifying one of the six groups (e.g., comparing received bits to all six group IDs). A group ID and/or a system ID are examples of an identifier. The radio matches received bits to one of the group IDs. Concurrently with determining a group ID, the radio recovers the clock (i.e., determines the clock edge so the radio can identify additional data in the data transmission). Determining group ID and clock recovery together can be helpful when starting an initialization sequence and/or when radio 101 is looking for other groups. Identifying groups can enable radio 101 to switch between groups faster.

G. Limiting Slots

In some embodiments, a number of slots is reduced in a TDMA protocol. For example, instead of having nine slots in a TDMA protocol, only two or three slots are used. Bandwidth of a channel of the radio service, data compression, preamble size, and/or complex modulation can be factors in determining how many slots to use. Also, use of repeaters can limit the number of slots used. But even if only two slots are used in a TDMA protocol, in some embodiments that would be better than a regular PTT radio because there would two communications (e.g., full duplex) instead of just one communication (e.g., half duplex).

Figure 6:
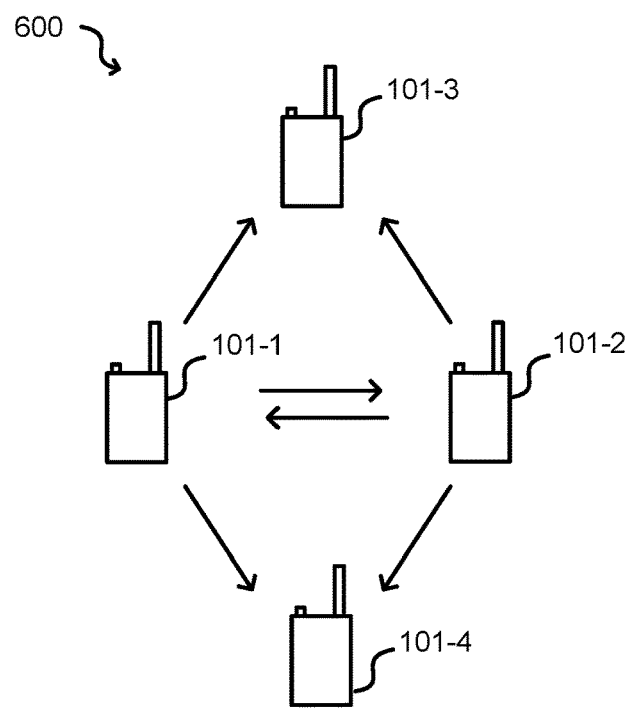
FIG. 6 is a simplified diagram of an embodiment of four radios communicating using TDMA and switch-to-talk (STT).

In some embodiments, switch-to-talk is used, as described in U.S. patent application Ser. No. 13/961,736, filed on Aug. 7, 2013 to allow more users than slots on the wireless-conferencing system. The '736 application is incorporated by reference for all purposes. For example, FIG. 6 shows a simplified diagram of an embodiment of four radios communicating using TDMA and switch-to-talk (STT). In FIG. 6, the first radio 101-1 transmits (e.g., voice data, represented by an arrow) to the second radio 101-2, the third radio 101-3, and to a fourth radio 101-4. The second radio 101-2 transmits (e.g., voice data) to the first radio 101-1, the third radio 101-3, and the fourth radio 101-4. The third radio 101-3 and the fourth radio 101-4 do not transmit (e.g., voice data) because the third radio 101-3 and the fourth radio 101-4 are in a listen-only mode.

If there are only two slots available for voice data, only two radios can transmit voice data. In some embodiments, if the third radio 101-3 requests a slot to transmit voice data, then a slot assignment is taken away from the first radio 101-1 or the second radio 101-2 and given to the third radio 101-3. Some example ways to reassign slots include: first in, first out; first in, first out, but not for a master radio; multi-tiered priority, such as master, slave 1A, slave 1B, slave 2A, and slave 2B, where slaves 1A and 1B have equal priority, slaves 2A and 2B have equal priority, and slaves 1 have higher priority than slaves 2; usage, such as a radio to transmit voice data that is recognized as speech least recently is the first to lose a slot assignment; and/or usage based on history of voice data that is recognized as speech, e.g., for a previous 30, 60, or 120 seconds, ranking each radio usage that is recognized as speech and dropping the radio with the lowest ranking (e.g., because a user of the lowest ranking radio is presumably speaking the least). In some embodiments, when a radio loses a slot, the radio transmits an audio signal (e.g., two tones of descending frequency) to a user of the radio (e.g., so the user knows the user's voice data isn't being transmitted). In some embodiments, a radio that loses a voice slot can still hear conversations from users of other radios, but the radio that loses the voice slot doesn't transmit voice data. In some embodiments, a switch or a button on a radio is used to request a voice slot. When a voice slot is assigned, the radio transmits an audio signal (e.g., three tones of ascending frequency) to the user of the radio (e.g., so the user of the radio knows voice data of the user is being transmitted).

H. Quasi-Frequency Hopping

In some embodiments, quasi-frequency hopping is used. For example, transmitting and receiving can hop from 462.5500 MHz, to 462.6000 MHz, to 462.5750 MHz, etc. (depending on channel availability). In some embodiments, only one radio transmits per channel and receives on many different channels allocated to the wireless-conferencing system. In some embodiments, buffers are used to hold data from other radios. Using multiple channels improves voice quality and/or lower compression techniques can be used.

In some embodiments, repeaters of a radio system are redesigned. In some embodiments, repeaters change from transmit to receive, or receive to transmit, so that information can be repeated to radios within range without affecting overhead time (e.g., preamble) allowed. In some embodiments, repeaters are not used if too many slots are used and/or if 25 kHz or 20 kHz channels are not available (e.g., only one channel may be available on a radio system having 12.5 kHz channel spacing). In some embodiments, repeaters are designed similarly as radios in a wireless-conferencing system are.

In some embodiments, a radio with dual transceiver capability is used such that the wireless-conferencing system is combined with users having PTT radios. For example, systems are used similar to those described in U.S. patent application Ser. No. 13/961,647. The '647 application is incorporated by reference for all purposes. In some embodiments, techniques used for narrowband channels is applied to broad-band wireless conferencing systems (e.g., channel spacing greater than or equal to 100 kHz 125 kHz, or 250 kHz) to increase a number of slots available for voice data (e.g., from 8 or 9 slots to 12, 16, 18, or more).

In some embodiments, one antenna with multiple splitters is used. For example, if a wireless-conferencing system is using three frequency channels, one antenna with three splitters could be used. In some embodiments, three antennas for three frequency channels are used. In some embodiments, data is combined digitally after demodulation. In some embodiments, channels are demodulated digitally (e.g., one antenna is used and the DSP separates different frequency channels with digital filters). In some embodiments, frequency hopping is used for increased security (e.g., to avoid being picked up by a radio scanner).

Figure 7:
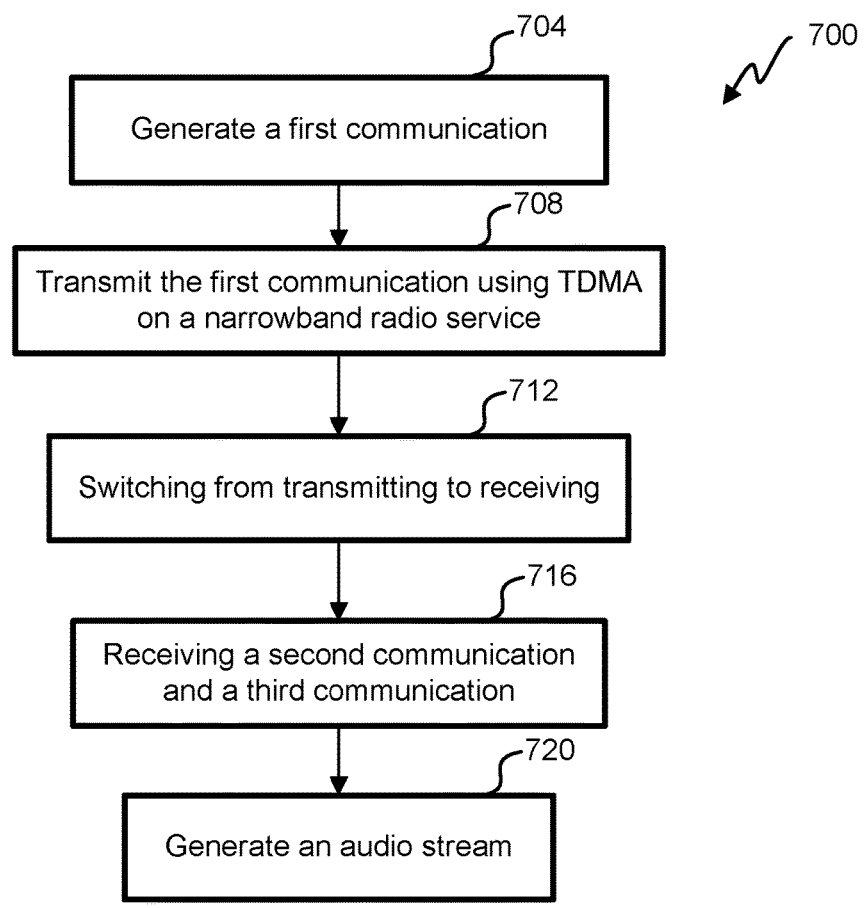
FIG. 7 illustrates a flowchart of an embodiment of a process for using TDMA on a narrowband radio service.

FIG. 7 illustrates a flowchart of an embodiment of a process 700 for using a TDMA protocol on a narrowband radio service. Process 700 begins in step 704 where a first communication is generated. In some embodiments, the first communication is generated by receiving an analog audio signal from a microphone of a first radio 101-1 and converting the analog audio signal into a digital format. The first communication comprises voice data from a user of the first radio 101-1. In some embodiments, the first communication comprises a preamble and a packet comprising voice data. For example, the preamble is limited to a system ID, a group ID, and a command.

In step 708, the first communication is transmitted, by the first radio 101-1, using TDMA on a narrowband radio service. In some embodiments, bandwidth used for transmitting the first communication is equal to or between 30 kHz and 1 kHz, or between 15 kHz and 5 kHz. For example, the first radio 101-1 is assigned to transmit during the first voice slot 304-1, and the first radio 101-1 transmits the first communication during the first voice slot 304-1. After transmitting the first communication, the first radio 101-1 switches from transmitting to receiving, step 712. In some embodiments, the first radio 101-1 switches from transmitting to receiving using a fast switch (e.g., equal to or less than 15 ms, 10 ms, 5 ms, 1 ms, 180 µs, or 100 µs, and greater than or equal to 1 µs).

In step 716, the first radio 101-1 receives a second communication and a third communication. For example, the second communication is a transmission received from the second radio 101-2, wherein the second communication includes voice data from a user of the second radio 101-2. In some embodiments, the third communication is a transmission received from the third radio 101-3 (e.g., in an embodiment with a TDMA protocol having at least three voice slots 304). In some embodiments, the third communication includes voice data from a user of the third radio 101-3. In some embodiments, the third communication is from the second radio 101-2. In step 720, an audio stream is generated using the second communication, the third communication, and the TDMA protocol. The audio stream is sent to a speaker of the first radio 101-1. The second communication and the third communication are combined based on the TDMA protocol. For example, the second communication and the third communication partially or fully overlap so that the user of the first radio 101-1 hears the user of the second radio 101-2 and the user of the third radio 101-3 speak at the same time. In some embodiments, the second communication and the third communication transmitted from the second radio 101-2 and are spliced serially together so that the user of the first radio 101-1 seems to hear continuous speaking of the user of the second radio 101-2. A person skilled in the art will recognize many variations and combinations.

The embodiments were chosen and described in order to explain the principles of the invention and practical applications to thereby enable others skilled in the art to best utilize the invention in various embodiments and with various modifications as are suited to the particular use contemplated.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to explain the principles of the invention and its practical applications to thereby enable others skilled in the art to utilize the invention in various embodiments and with various modifications as are suited to the particular use contemplated.

A recitation of "a", "an", or "the" is intended to mean "one or more" unless specifically indicated to the contrary.

What is claimed is:

1. A system of duplex radios for communicating on a narrowband radio service, the system comprising:
   a first radio, the first radio comprising:
      a transmitter;
      a receiver; and
      electronics configured to:
         cause the transmitter of the first radio to transmit a first communication using a time division multiple access protocol, wherein:
            transmitting the first communication uses a bandwidth equal to or less than 30 kHz and equal to or greater than 1 kHz;
            the first communication comprises voice data; and
            the first radio is assigned a first time slot of the time division multiple access protocol to transmit voice data;
         receive a second communication from the receiver of the first radio, wherein:
            the first radio receives the second communication after transmitting the first communication; and
            the first radio switches between transmitting the first communication to receiving the second communication in less than 15 ms and greater than 1 µs; and
         generate a first audio stream based on the second communication and the time division multiple access protocol; and
   a second radio, the second radio comprising:
      a transmitter;
      a receiver; and
      electronics configured to:
         receive the first communication from the receiver of the second radio, wherein the receiver of the second radio directly receives the first communication transmitted from the transmitter of the first radio;
         cause the transmitter of the second radio to transmit the second communication using the time division multiple access protocol, wherein:
            transmitting the second communication uses a bandwidth equal to or less than 30 kHz and equal to or greater than 1 kHz;
            the second communication comprises voice data; and
            the second radio is assigned a second time slot of the time division multiple access protocol to transmit voice data; and
         generate a second audio stream based on the first communication and the time division multiple access protocol.

2. The system of duplex radios for communicating on the narrowband radio service as recited in claim 1, wherein the narrowband service is General Mobile Radio Service (GMRS) and the first communication and the second communication are transmitted on a channel of GMRS.

3. The system of duplex radios for communicating on the narrowband radio service as recited in claim 1, wherein the narrowband service is Family Radio Service (FRS) and the first communication and the second communication are transmitted on a channel of FRS.

4. The system of duplex radios for communicating on the narrowband radio service as recited in claim 1, wherein the transmitter of the first radio and the receiver of the first radio are combined into a transceiver.

5. The system of duplex radios for communicating on the narrowband radio service as recited in claim 1, further comprising a third radio that directly receives communications from the first radio and the second radio.

6. The system of duplex radios for communicating on the narrowband radio service as recited in claim 5, wherein the third radio is assigned a time slot to transmit voice data using the time division multiple access protocol.

7. The system of duplex radios for communicating on the narrowband radio service as recited in claim 1, wherein the time division multiple access protocol has no more than three time slots in a given frame for transmitting voice data.

8. A system of duplex radios for communicating on a narrowband radio service, the system comprising:
 a first radio, the first radio comprising:
  a transmitter;
  a receiver; and
  electronics configured to:
   cause the transmitter of the first radio to transmit a first communication using a time division multiple access protocol, wherein:
    transmitting the first communication uses a bandwidth equal to or less than 30 kHz and equal to or greater than 1 kHz;
    the first communication comprises voice data; and
    the first radio is assigned a first time slot of the time division multiple access protocol to transmit voice data;
   receive a second communication from the receiver of the first radio:
   use a group ID in a preamble as a parallel correlator; and
   generate a first audio stream based on the second communication and the time division multiple access protocol; and
 a second radio, the second radio comprising:
  a transmitter;
  a receiver; and
  electronics configured to:
   receive the first communication from the receiver of the second radio, wherein the receiver of the second radio directly receives the first communication transmitted from the transmitter of the first radio;
   cause the transmitter of the second radio to transmit the second communication using the time division multiple access protocol, wherein:
    transmitting the second communication uses a bandwidth equal to or less than 30 kHz and equal to or greater than 1 kHz;
    the second communication comprises voice data; and
    the second radio is assigned a second time slot of the time division multiple access protocol to transmit voice data; and
   generate a second audio stream based on the first communication and the time division multiple access protocol.

9. The system of duplex radios for communicating on the narrowband radio service as recited in claim 8, wherein the electronics of the first radio are further configured to use a frequency division multiple access protocol for transmitting or receiving, or both transmitting and receiving.

10. A method of duplex radio communication using a narrowband radio service, the method comprising:
 generating a first communication, wherein the first communication comprises voice data from a user of a first radio;
 transmitting the first communication using the first radio, wherein:
  transmitting the first communication uses a bandwidth equal to or less than 30 kHz and equal to or greater than 1 kHz; and
  transmitting the first communication uses a time division multiple access protocol;
 switching the first radio from transmitting to receiving within a frame of the time division multiple access protocol;
 receiving a second communication and a third communication, wherein:
  the second communication comprises voice data from a user of a second radio;
  the second communication comprises a preamble;
  the second communication is received after the first communication is transmitted; and
  the third communication is received after the second communication;
 using an identifier in the preamble as a pattern for a parallel correlator to identify a clock edge of the second communication; and
 generating an audio stream using the second communication, the third communication, and the time division multiple access protocol.

11. The method of duplex radio communication using the narrowband radio service as recited in claim 10, wherein the second communication and the third communication are received from the second radio.

12. The method of duplex radio communication using the narrowband radio service as recited in claim 10, wherein:
 the second communication is received from the second radio; and
 the third communication is received from a third radio.

13. The method of duplex radio communication using the narrowband radio service as recited in claim 10, wherein, in the audio stream, the second communication and the third communication at least partially overlap in time.

14. The method of duplex radio communication using the narrowband radio service as recited in claim 10, further comprising switching from using the time division multiple access protocol to using the first radio to communicate using half-duplex communication.

15. The method of duplex radio communication using the narrowband radio service as recited in claim 14, wherein:
 the first radio operating in half duplex transmits analog signals; and
 the first radio using the time division multiple access protocol transmits digital signals.

16. The method of duplex radio communication using the narrowband radio service as recited in claim 10, wherein the time division multiple access protocol has no more than three time slots in a frame for voice data.

17. The method of duplex radio communication using the narrowband radio service as recited in claim 10, wherein the time division multiple access protocol has no more than two time slots in a frame for voice data.

18. The method of duplex radio communication using the narrowband radio service as recited in claim 10, wherein the identifier in the preamble is one of several possible identifiers of a known set of identifiers.

* * * * *